(12) United States Patent
Landry et al.

(10) Patent No.: US 6,732,301 B1
(45) Date of Patent: May 4, 2004

(54) SERIAL BUS DIAGNOSTIC PORT OF A DIGITAL SYSTEM

(75) Inventors: John A. Landry, Spring, TX (US); William W. Diehl, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/519,443

(22) Filed: Mar. 6, 2000

(51) Int. Cl.⁷ .................................. H02H 3/05
(52) U.S. Cl. ......................... 714/43; 710/110
(58) Field of Search .................. 714/43, 56; 710/10, 710/11, 110, 305, 306, 307, 240

(56) References Cited

U.S. PATENT DOCUMENTS

| | | | |
|---|---|---|---|
| 5,784,581 A | * | 7/1998 | Hannah ...................... 710/110 |
| 6,073,205 A | * | 6/2000 | Thomson ..................... 711/100 |
| 6,119,194 A | * | 9/2000 | Miranda et al. ............. 710/306 |
| 6,226,700 B1 | * | 5/2001 | Wandler et al. ............. 710/312 |
| 6,334,160 B1 | * | 12/2001 | Emmert et al. ............... 710/11 |
| 6,415,348 B1 | * | 7/2002 | Mergard et al. ............. 710/305 |

OTHER PUBLICATIONS

*IEEE Standard Test Access Port and Boundary–Scan Architecture*, Institute of Electrical and Electronics Engineers, Inc., Oct. 21, 1993, pp. i through xvii, pp. 1–1 through 12–6, and pp. A–1 through A–12.

*Supplement to IEEE Std 1149.1–1990, IEEE Standard Test Access Port and Boundary–Scan Architecture*, Institute of Electrical and Electronics Engineers, Inc., Mar. 1, 1995, pp. i through viii, and pp. 1 through 66.

*Wireless Application of Protocol Architecture Specification*, WAP Architecture, Version 30, Apr. 1998, pp. 1 through 20.

*Debug Port Specification*, Microsoft Corp., Microsoft Draft 0.95, Jul. 23, 1999, http://channels.microsoft.com/hwdev/NewPC/debugspec.htm; 6 pages.

* cited by examiner

*Primary Examiner*—Dieu-Minh Le

(57) ABSTRACT

A digital system provides a serial bus diagnostic port such as, for example, a universal serial bus (USB) diagnostic port. The USB diagnostic port can include a USB slave device operable to interface to a universal serial bus, a flash memory controller interface coupled to the USB slave device and operable to interface to a flash memory controller, and a test access port controller coupled to the USB slave device and operable to interface to a test access port. The diagnostic port can further include a system interface coupled to the USB slave device and operable to interface to an integrated controller independently of an operating system. Via the diagnostic port, a USB testing tool with testing software can access and debug internal logic of the digital system. As an alternative to a USB diagnostic port, the serial bus diagnostic port can be implemented in a variety of wired or wireless implementations such as, for example, an I.E.E.E. 1394 diagnostic port, an Ethernet diagnostic port, or a wireless Internet diagnostic port. Further, the serial bus diagnostic port can, for example, be used for software development, in-factory testing or in-field diagnostics of the digital system.

22 Claims, 3 Drawing Sheets

SERIAL BUS DIAGNOSTIC PORT OF A DIGITAL SYSTEM

BACKGROUND OF THE INVENTION

1. Field of the Invention

The present invention relates to a serial bus diagnostic port of a digital system.

2. Description of the Related Art

With the growing proliferation of digital systems, which for example include computers, digital televisions, digital camcorders, satellite receivers, digital cameras, digital video or versatile disc (DVD) players, digital cell phones, digital video cassette recorders, digital scanners, game players, set-top boxes, digital monitors, personal digital assistants and to MP3 players, debugging of digital systems is becoming a paramount concern. Debugging of digital systems has typically involved use of integrated legacy devices such as a parallel port, a RS-232 or compatible port, or a floppy drive. For example, debugging of a computer system can entail use of a parallel port, RS-232 port, or a floppy drive. A parallel port has commonly been used to program flash memory in a portable computer system using a Super I/O chip. A RS-232 or EIA232 port, a standard serial port for connecting to serial devices such as a modem or mouse, has commonly been used for debugging of an operating system of a computer system. Before a computer system is shipped, a computer manufacturer has typically programmed BIOS (Basic Input/Output Services) for the computer system utilizing a floppy drive. In fact, a floppy drive of a computer system has typically been used more for diagnostic and debugging purposes than general file transfer purposes. Other examples of integrated legacy devices of digital systems used for debugging purposes include dedicated debug ports and proprietary modules for flash programming and testing.

Digital systems are increasingly integrating more logic, particularly in the case of system-on-a-chip implementations, such that certain internal busses are no longer accessible for debug purposes. Without access to these internal busses, not only have many highly integrated digital systems become less reliable, but also development costs of many highly integrated digital systems have increased.

Recently, with the current evolution of digital systems, there has been a growing shift toward legacy-free digital systems to improve system reliability, lower system costs, and enhance ease of use. As a result, legacy devices, such as a parallel port, a RS-232 port and a floppy drive, which were typically integrated in a digital system are increasingly not being offered or supported on new digital systems. Thus, for many new digital systems, an effective way of debugging a digital system has not been available. Further, since support of legacy devices by digital systems has varied among older digital systems and among newer digital systems, there is currently no industry standard methodology for debugging or diagnosing a digital system.

Digital systems are increasing supporting universal serial bus (USB) ports. USB ports, however, have been ill-suited for software debugging in light of the software-intensive nature of a universal serial bus. Typically, in a computer system having USB ports, a USB master controller is virtualized and embedded in an operating system, such that software debugging of the computer system has not been a viable option. Serial or parallel ports or headers and/or proprietary modules have typically been integrated into digital systems with USB ports to allow for debugging. Debugging of digital systems thus has primarily or strictly been limited to the integrated legacy devices described above.

SUMMARY OF THE INVENTION

Briefly, a digital system provides a serial bus diagnostic port such as, for example, a universal serial bus (USB) diagnostic port. The USB diagnostic port can include a USB slave device operable to interface to a universal serial bus, a flash memory controller interface coupled to the USB slave device and operable to interface to a flash memory controller, and a test access port controller coupled to the USB slave device and operable to interface to a test access port. The diagnostic port can further include a system interface coupled to the USB slave device and operable to interface to an integrated controller. Via the diagnostic port, a USB testing tool with testing software can access and debug internal logic of the digital system.

As an alternative to a USB diagnostic port, the serial bus diagnostic port can be implemented in a variety of wired or wireless implementations such as, for example, an I.E.E.E. 1394 diagnostic port, an Ethernet diagnostic port, or a wireless Internet diagnostic port. Further, the serial bus diagnostic port can, for example, be used for software development, in-factory testing or in-field diagnostics of the digital system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
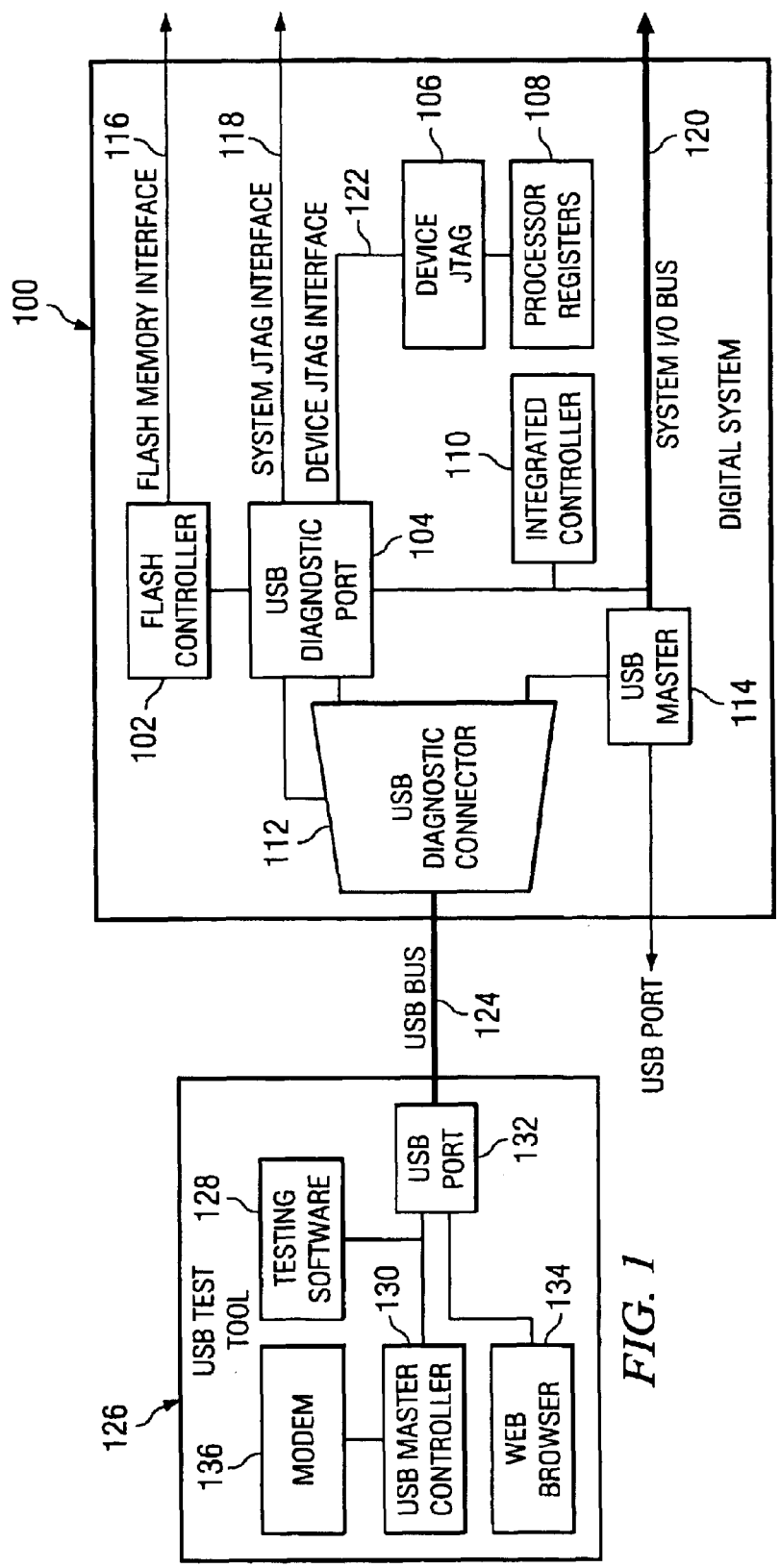
FIG. 1 is a schematic diagram of a universal serial bus (USB) test tool coupled to a digital system containing a universal serial bus (USB) diagnostic port.

Turning now to the drawings, FIG. 1 shows an exemplary universal serial bus (USB) diagnostic system environment providing a USB test or diagnostic tool 126 coupled or interfaced to a digital system 100. The USB test tool 126 is shown including a USB port 132 coupled to testing software 128, a USB master controller 130 and a web browser 134. The USB master controller 130 is further coupled to a modem 136. The USB test tool 126 can employ the testing software 128 to test the digital system 100 via communication through a USB diagnostic port 104 in the digital system 100. Via the modem 136, testing software 128 can be downloaded to the USB test tool 126. The web browser 134 may provide a graphical user interface for the testing software 128. The USB test tool 126 can essentially be any digital system with a USB master controller 130. For example, the USB test tool 126 can be a portable or handheld computer containing the USB master controller 130. The USB test tool 126 can be configured to identify the digital system 100 and then to load the proper testing software 128 to test the digital system 100. Before identification of the digital system 100 by the USB test tool 126, the digital system 100 can appear the same as any other digital system 100. Testing functions can be exclusively provided by the testing software 128 so that testing functions are outside or behind the USB interface. In accordance with the disclosed USB diagnostic system environment, no special test equipment is needed to test or debug the digital system 100.

A USB bus 124 serves as an external interface serial bus between the USB test tool 126 and the digital system 100. The digital system 100 provides a USB diagnostic connector 112 coupled to the USB bus 124. The USB diagnostic connector 112 is shown shared by the USB diagnostic port 104 and a USB master 114. Alternatively, the USB diagnostic connector 112 can be dedicated to the USB diagnostic port 104. The USB diagnostic connector 112 can be implemented with a standard USB connector. As shown, the USB diagnostic port 104 can interface to the USB bus 124 (through the USB diagnostic connector 112), the USB master 114, an integrated controller 110, a device JTAG 106, and/or a flash controller 102. The integrated controller 110, for example, can be a graphics processor or a memory controller. The device JTAG 106 is further coupled to processor or other internal registers 108. For this example, the integrated controller 110, the device JTAG 106, the processor registers 108, and the flash controller 102 collectively represent some of the internal logic of the digital system 100. The USB diagnostic port 104 thus provides a way to access internal logic of the digital system 100. The flash controller 102 is shown coupled to a flash memory interface 116; the USB diagnostic port 104 is shown coupled to a system JTAG interface 118 and a device JTAG interface 122; and the integrated controller 110 and the USB master 114 are shown coupled to a system input/output (I/O) bus 120. In this way, other logic internal to the digital system 100 may also be accessed via the USB diagnostic port 104. The USB diagnostic port 104 can, for example, be used for in-factory testing, software development and field diagnostics. As a new type of USB device, a USB identifier and device class can be defined for the USB diagnostic port 104.

Figure 2:
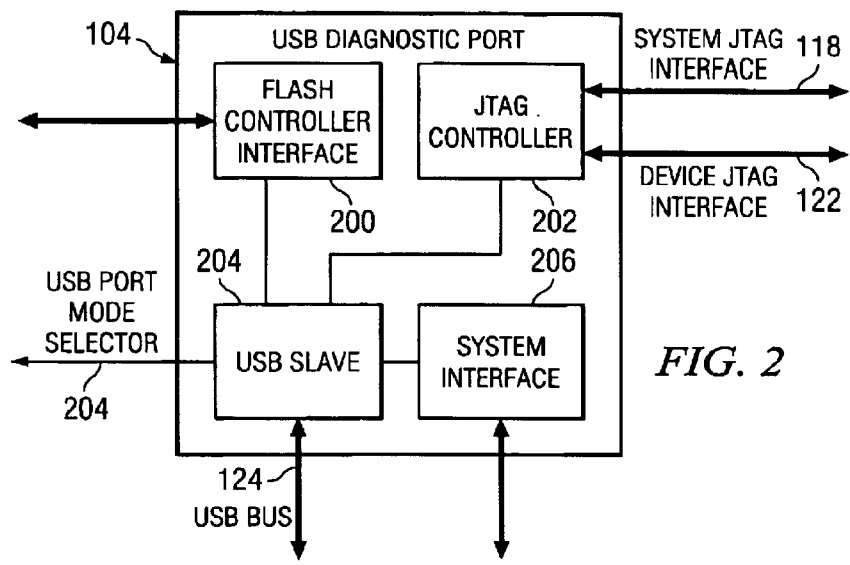
FIG. 2 is a schematic diagram of the USB diagnostic port of FIG. 1.

Referring to FIG. 2, an exemplary architecture of the USB diagnostic port 104 is shown. The USB diagnostic port 104 provides four interfaces: a flash controller interface 200, a JTAG controller 202, a universal serial bus (USB) slave 204 and a system interface 206. The USB diagnostic connector 112 might be placed in a diagnostic mode by any of the interfaces. The USB slave 204 provides a USB interface to the USB bus 124, the flash controller 200, the JTAG controller 202 and the system interface 206. Essentially, the USB diagnostic port 104 can provide a USB slave coupled to an interface to internal logic of the digital system 100. The USB slave 204 also provides control of the USB diagnostic connector 112. The USB slave 204 can be configured to enable a diagnostic mode of the USB diagnostic connector 112 after a system reset. In the diagnostic mode, the USB diagnostic connector 112 is coupled to the USB diagnostic port 104. The diagnostic mode may be entered or maintained in response to detection of the USB test tool 126 by the USB diagnostic connector 112. The USB slave 204 is independent of an operating system for controlling the digital system 100. If a problem occurs with the operating system, the USB diagnostic port 104 thus can be used to debug the digital system 100 underneath its operating system. The functional interface of the USB slave 204 to the flash controller interface 200, the JTAG controller 202 and the system interface 206 is independent of the particular condition or mode of the digital system 100. It should be understood that internal logic of the digital system 100 may be coupled to the USB slave 204 in a variety of ways.

The flash controller interface 200 provides an interface to a flash controller independent of the particular flash controller implementation. Via the flash controller interface 200, a flash controller can program a flash memory through the USB slave 204 and 10 the USB diagnostic port 104. The flash controller interface 200 may interact with flash controller firmware in order to access a flash memory. Any flash controller implementation differences can be handled through software. The flash controller interface 200 may provide security such that only certain USB test tools can successfully interface to a flash controller. In this way, rogue devices are prevented from corrupting a flash memory. A flash controller interface is understood to be a standard I/O interface to a flash controller.

A JTAG controller is a standard interface to a JTAG. The JTAG controller 202 can interface to the device JTAG 106 and a system JTAG. The device JTAG 106 may be on the same chip as the USB diagnostic port 104, and the system JTAG may be on a different chip than the USB diagnostic port 104. In this way, the JTAG controller 202 supports single-chip and multi-chip digital systems. As shown in FIG. 1, the device JTAG 106 interfaces to the processor registers 108. In this way, values may be read from or written to the processor registers 108 with the JTAG controller 202 of the USB diagnostic port 104. Alternatively, the JTAG controller 202 can provide access to other internal logic of the digital system 100. The JTAG controller 202 allows for testing of the digital system 100 without interfering with normal operation of the digital system 100. It should be understood that the term JTAG controller generally refers to any test access port controller which is a subset or superset of a JTAG controller as defined by the I.E.E.E. 1149.1 and the I.E.E.E. 1149.1a standard. The I.E.E.E. 1149.1 standard (Approved Feb. 15, 1990) and the I.E.E.E. 1149.1a standard (Approved Jun. 17, 1993), described in the publication I.E.E.E. Standard Test Access Port and Boundary-Scan Architecture, published by the I.E.E.E., on Oct. 21, 1993, are herein incorporated by reference as if set forth in their entirety. The JTAG controller 202 provides low level debug through the USB diagnostic port 104 independent of the particular condition or mode of the digital system 100. Further, the JTAG controller 202 provides a bridge from the USB slave 204 to on-chip or off-chip JTAG signals of the digital system 100. The debug capabilities of the JTAG controller 202 can depend upon the particular JTAG controller implementation.

The system interface 206 essentially serves as a master I/O controller which can communicate with internal logic of the digital system 100 independent of an operating system. Alternatively, the operating system itself can utilize the system interface 206 as a debug port. Utilizing the system interface 206 in combination with the JTAG controller 202, most, if not all, internal logic of a digital system 100 can be debugged or tested. It should be understood that the accessibility of certain internal logic of the digital system 100 may depend upon the degree of integration of the digital system 100 and the software support provided by the digital system 100. The system interface 206 can provide debug registers which can be configured to emulate a Component Object Model (COM) port or a "port 84". One use of the system interface 206 is for debugging BIOS in the digital system 100. Another use of the system interface 206 is for debugging the integrated controller 110.

Figure 3:
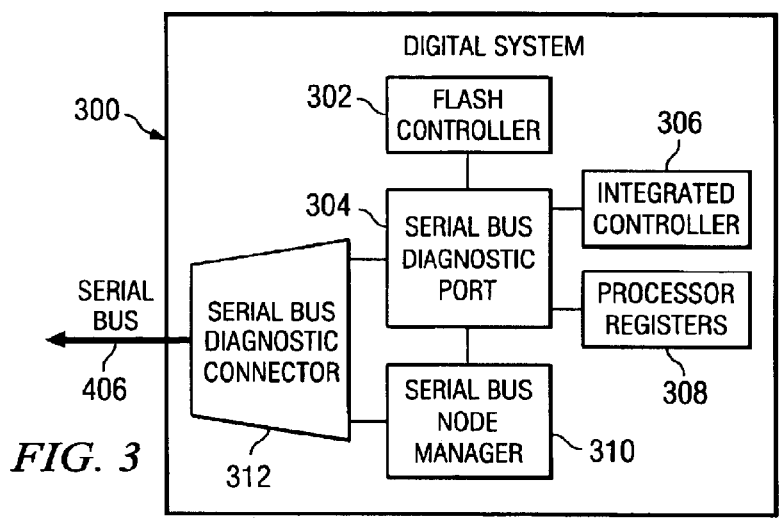
FIG. 3 is a schematic diagram of a digital system containing a serial bus diagnostic port.

Referring to FIG. 3, a digital system 300 providing a serial bus diagnostic port 304 is shown. The serial bus diagnostic port 304 can interface to a serial bus 406, a serial bus node manager 310, an integrated controller 306, processor or other internal registers 308, and/or a flash controller 302. The digital system 300 is shown including a serial bus diagnostic connector 312 shared by the serial bus diagnostic port 304 and the serial bus node manager 310. Alternatively, the serial bus diagnostic connector 312 can be dedicated to the serial bus diagnostic port 304. Through the serial bus diagnostic port 304, a serial bus test tool similar to the USB test tool 126 of FIG. 1 can be used to access internal logic of the digital system 300. It should be understood that internal logic, such as the flash controller 302, the integrated controller 306, and the processor registers 308 may be coupled to the serial bus diagnostic port 304 in a variety of ways.

The serial bus 406 can be a high speed external interface serial bus which interfaces internally with the digital system 300. For example, the serial bus 406 can include a transaction layer, a link layer, and a physical layer. The transaction layer can detect the transaction type of packet data transferred to or from a serial bus node. The physical layer can provide the serial bus physical media, handle transmission and reception of the packet data, and provide the electrical and mechanical interface for the serial bus 406. The link layer can interact with both the transaction layer and the physical layer. The link layer basically can respond to changes in the state of the serial bus 406 and can prepare packets for transmission through the physical layer. One example of such a serial bus 406 is the high performance serial bus defined by the I.E.E.E. 1394–1995 standard (A.K.A. "Firewire") published by the I.E.E.E. on Aug. 30, 1996, which is incorporated herein by reference as if set forth in its entirety.

The serial bus node manager 310 is basically a node with management level control of other nodes. The serial bus node manager 310 can provide commands to a serial bus node and can receive status information from a serial bus node. The serial bus node manager 310 basically manages events on the serial bus 406.

Figure 4:
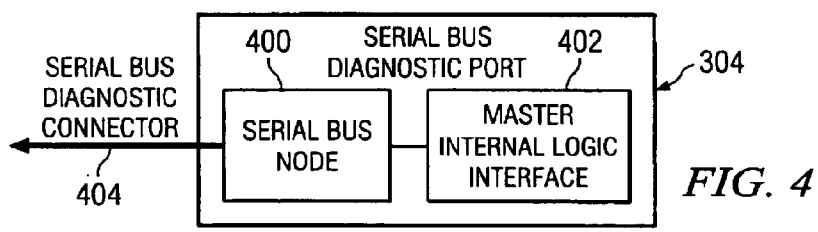
FIG. 4 is a schematic diagram of the serial bus diagnostic port of FIG. 3.

Referring to FIG. 4, an exemplary architecture of the serial bus diagnostic port 304 is shown. The exemplary serial bus diagnostic port 304 includes a serial bus node 400 coupled to a master internal logic interface 402. The master internal logic interface 402 provides an interface to internal logic of the digital system 300. The internal logic, for example, can be a flash controller, an integrated controller or processor registers. The master internal logic interface 402 can be an integration of a flash controller interface, a JTAG controller, and a system interface similar to that described in FIG. 2. The serial bus node 400 provides a signal 404 to the serial bus diagnostic connector 312.

The serial bus node 400 is essentially an addressable logical entity or device capable of attaching to the serial bus 406. The serial bus 406 may be configured to support asynchronous data transfer and isochronous data transfer. In transferring packet data to a serial bus test tool, the serial bus node 400 serves as a source node. In receiving packet data from a serial bus test tool, the serial bus 400 serves as a destination node.

Figure 5:
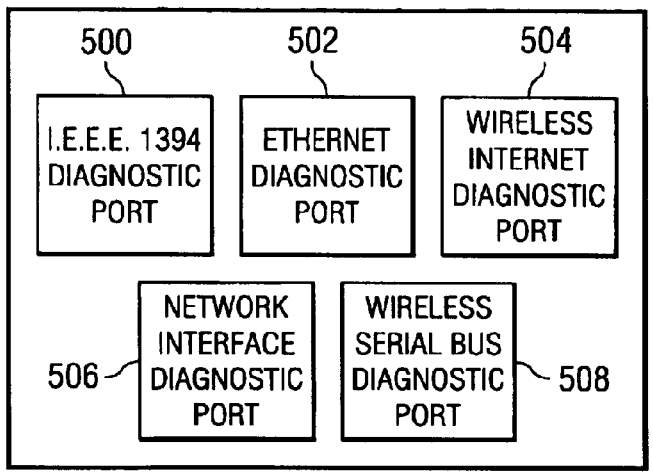
FIG. 5 is an illustration of exemplary types of the serial bus diagnostic port of FIGS. 3 and 4.

The serial bus diagnostic port 304 can be implemented in a variety of ways. Referring to FIG. 5, some examples of different implementations for the serial bus diagnostic port 304 are shown. These examples include a I.E.E.E. 1394 diagnostic port 500, an Ethernet diagnostic port 502, a wireless Internet diagnostic port 504, a network interface diagnostic port 506 and a wireless serial bus diagnostic port 508. For the network interface diagnostic port 506, the serial bus node 400 can be a TCP/IP interface. For the Ethernet diagnostic port 502, the serial bus node 400 can be an Ethernet node. As represented by these examples, the serial bus diagnostic port 304 can be a wired or wireless implementation.

Figure 6:
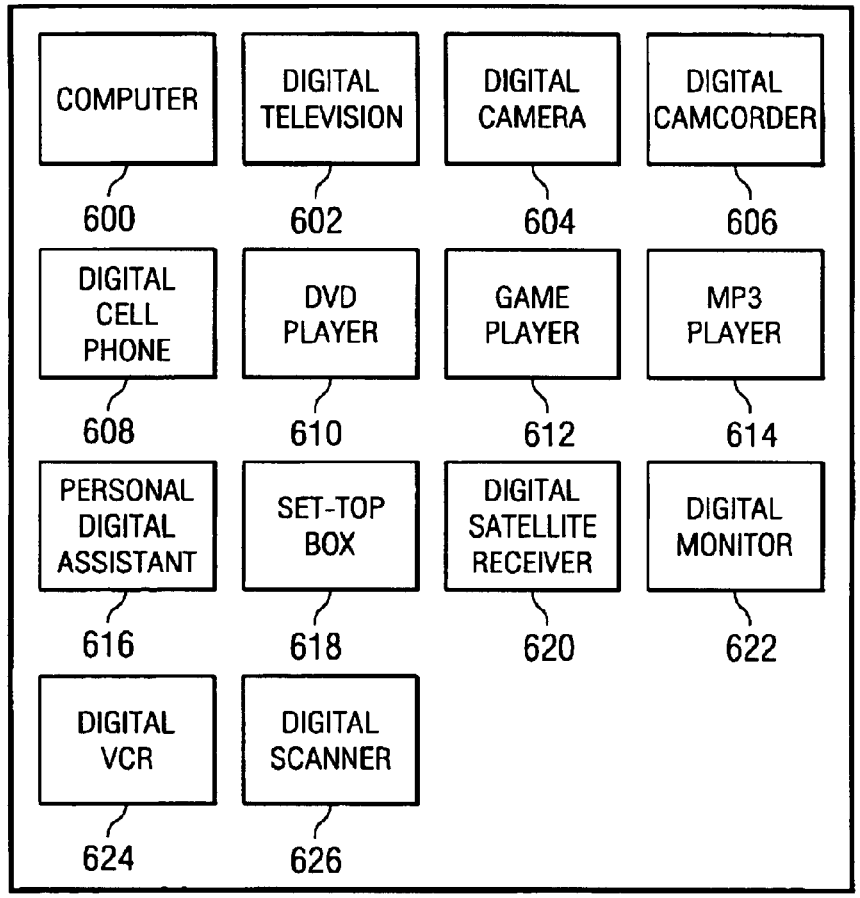
FIG. 6 is an illustration of exemplary types of the digital system of FIGS. 1 and 3.

Referring to FIG. 6, examples of the digital system 100 are shown. These examples, which are illustrative and not exhaustive, include a computer 600, a digital television 602, a digital camera 604, a digital camcorder 606, a digital cell phone 608, a digital video disk (DVD) player 610, a game player or station 612, a MP3 player 614, a personal digital assistant 616, a set-top box 618, a digital satellite receiver 620, a digital monitor 622, a digital video cassette recorder (VCR) 624, and a digital scanner 626. The computer 600 can, for example, be a digital appliance which lacks a hard drive, a standard RS-232 port and a parallel port. The term "computer" thus should be broadly interpreted to include a variety of Internet and/or PC-like appliances or terminals. It should be apparent from these examples of consumer and commercial digital systems that the USB diagnostic port 104 can be used with debugging or testing of almost any digital system. The USB diagnostic port 104 thus can be built into all digital systems and serve as a standard way of debugging and testing simple and complex digital systems.

The foregoing disclosure and description of various embodiments are illustrative and explanatory thereof, and various changes in the serial bus, internal logic, digital system and interfaces, as well as in the details of the illustrated hardware and software and construction and method of operation may be made without departing from the spirit of the invention.

We claim:

1. A universal serial bus (USB) diagnostic system environment, comprising:
   a digital system operating under control of an operating system, the digital system comprising:
      a flash memory controller;
      internal logic;
      a universal serial bus (USB) diagnostic port, comprising:
         a universal serial bus (USB) slave device operable independently of the operating system to permit external interaction with the operating system to interface to a universal serial bus;
         a flash memory controller interface coupled to the USB slave device and to the flash memory controller; and
      a test access port controller coupled to a test access port and to the USB slave device;
      a USB connector coupled to the slave device of the USB diagnostic port to provide external access to and from the USB diagnostic port;
      a universal serial bus (USB) test tool coupled to the USB diagnostic port through a universal serial bus and the USB connector, the USB test tool comprising:
         a universal serial bus (USB) master controller;
         a universal serial bus (USB) port coupled to the USB master controller and via a universal serial bus to the USB connector; and
         testing software operable to communicate with the USB diagnostic port via the USB connector under control by said master controller to access the flash memory controller interface and the test access port to perform flash memory and internal logic test and debug operations.

2. The USB diagnostic system environment of claim 1, the USB diagnostic port comprising:
a system interface coupled to the USB slave device and operable to interface to an integrated, controller of the digital system to permit test and debug operations by the testing software.

3. The digital system of claim 1, wherein the internal logic comprises processor registers.

4. A digital system operable under control of an operating system, comprising:
internal logic;
a flash memory controller;
a universal serial bus (USB) diagnostic port, comprising:
a universal serial bus (USB) slave device operable independently of the operating system to permit external interaction with the operating system;
a flash memory controller interface coupled to the USB slave device and to the flash memory controller; and
a test access port controller coupled to the USB slave device;
a test access port coupled to the test access port controller;
a USB connector interfacing with and providing external diagnostic access to and from the USB diagnostic port, said USB connector permitting interactive access under external control via said USB slave device to and from the flash memory controller and to and from the test access port controller.

5. The digital system of claim 4, including a USB master and an integrated controller coupled to a system I/O bus;
said USB diagnostic port including a system interface; and wherein said system interface is coupled to the system I/O bus (120).

6. The digital system of claim 4, wherein the USB connector can be connected selectively to the USB diagnostic port or to the USB master.

7. The digital system of claim 6, wherein the USB slave device is operable to connect the USB connector to the USB diagnostic port after a system reset.

8. The digital system of claim 4, the USB diagnostic port comprising:
a system interface coupled to the USB slave device and to the system I/O bus and operable to interface to an integrated controller.

9. The digital system of claim 4, wherein the system interface operates independently of the operating system to permit external test and debug communication with the internal logic via said USB connector.

10. The digital system of claim 4, wherein the flash memory controller interface interfaces to the flash memory controller for flash memory programming through the USB slave device.

11. The digital system of claim 4, the test access port controller comprising:
a Joint Test Action Group (JTAG) controller operable to interface to processor registers through a JTAG port.

12. The digital system of claim 4, the test access port controller comprising:
a Joint Test Action Group (JTAG) controller operable to interface to logic in the digital system through a JTAG port.

13. A digital system operable under control of an operating system, comprising:

internal logic;
a controller coupled to a system I/O bus and to a USB master;
a flash memory controller;
a universal serial bus (USB) diagnostic port, comprising:
a universal serial bus (USB) slave device interfacing with a USB connector, said slave device operable independently of the operating system to permit external test and debug interaction with the operating system;
a flash memory controller interface coupled to the USB slave device and to the flash memory controller to permit externally controlled interactive flash memory test and debug access via said USB connector; and
a test access port controller coupled to the USB slave device and to a test access port, to permit external test and debug access of said internal logic via said USB connector.

14. The digital system of claim 13, wherein the USB diagnostic port also includes a further test access port coupled to the USB slave device to permit external test and debug access of process registers in the digital system.

15. The digital system of claim 13, including a USB master and a controller coupled to a system I/O bus;
said USB diagnostic port including a system interface; and wherein said system interface is coupled to the system I/0 bus to permit external test and debug access from said USB connector to said internal logic independently of the operating system.

16. The digital system of claim 14, wherein the USB connector can be connected selectively to the USB diagnostic port or to the USB master and the USB slave device is operable to connect the USB connector to the USB diagnostic port after a system reset.

17. A digital system, comprising
internal logic;
a flash memory controller;
a serial bus coupled to a serial bus connector;
and a serial bus diagnostic port comprising:
a serial bus node coupled to said serial bus connector to permit transfer of data to and from said serial bus;
said serial bus node coupled to a master internal logic interface providing interface coupling to said flash memory controller and said internal logic and a test access port controller;
a serial bus node manager coupled to said serial bus to transfer commands to and receive information from said serial bus node to manage events on said serial bus;
wherein said serial bus diagnostic port permits externally controlled test and debug access from said serial bus connector via said master internal logic interface to said flash memory controller and said internal logic.

18. The digital system of claim 17, further comprising:
wherein said serial bus diagnostic connector is operable to selectively couple the serial bus diagnostic port or the serial bus node manager to the serial bus.

19. The digital system of claim 17, wherein the serial bus diagnostic port comprises an I.E.E.E. 1394 diagnostic port.

20. The digital system of claim 17, wherein the serial bus diagnostic port comprises a network interface diagnostic port.

21. The digital system of claim 17, wherein the serial bus diagnostic port comprises a wireless Internet diagnostic port.

22. The digital system of claim 17, wherein the serial bus diagnostic port comprises a universal serial bus (USB) diagnostic port.

* * * * *